J. ROSENBLATT.
EYEGLASS MOUNTING.
APPLICATION FILED JAN. 26, 1917.
1,251,581.
Patented Jan. 1, 1918.
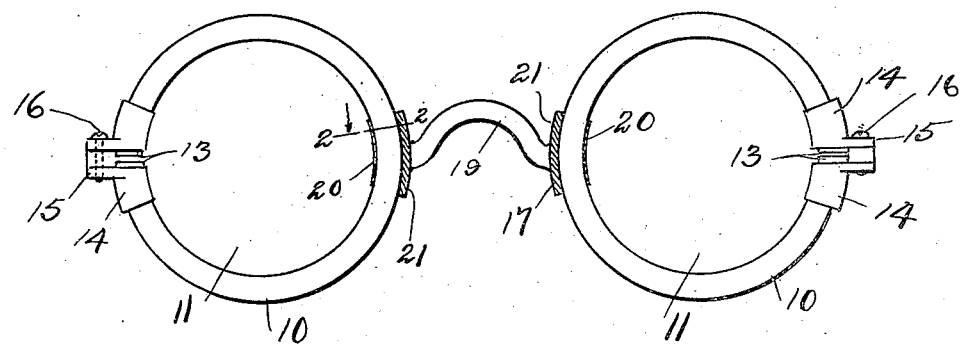
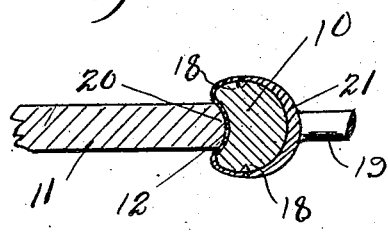
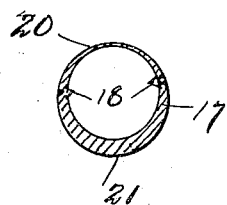
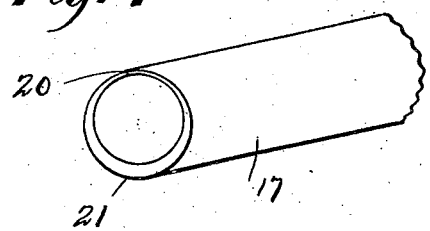
Witnesses
A. F. Macready.
J. L. Macdermott.
Inventor
Joseph Rosenblatt.
By
Howard E. Barlow
Attorney

UNITED STATES PATENT OFFICE.

JOSEPH ROSENBLATT, OF PROVIDENCE, RHODE ISLAND.

EYEGLASS-MOUNTING.

1,251,581.  Specification of Letters Patent.  Patented Jan. 1, 1918.

Application filed January 26, 1917. Serial No. 144,574.

*To all whom it may concern:*

Be it known that I, JOSEPH ROSENBLATT, a citizen of the United States, and resident of the city of Providence, in the county of Providence and State of Rhode Island, have invented certain new and useful Improvements in Eyeglass-Mountings, of which the following is a specification.

This invention relates to eyeglass mountings, and has for its object to provide an attachment for such a mounting adapted more particularly for use as a means of connecting the bridge member to non-metallic or other lens frames and consists essentially in the provision of short sections of metallic tubing, each having that portion of its wall on the outer diameter of the frame, much thicker than that portion on the inner diameter of the frame, for accomplishing a three fold object; first, the thickened portion of the wall provides heavy stock to which the nose bridge portion may be readily connected by riveting, soldering or otherwise; second, this thickened portion stiffens the nose bridge attaching parts; and third, by providing an extremely thin portion of the tube at the point where the lens engages the frame practically no interference is offered to the positioning of the lens in its frame.

My particular construction of tubing is not restricted, however, to providing an attaching means for the nose-bridge as the same may serve as clamps for drawing together the ends of the frame for binding the lens therein and also to provide a pivot joint for the temple.

With these and other objects in view, the invention consists of certain novel features of construction, as will be more fully described, and particularly pointed out in the appended claims.

In the accompanying drawings:

Figure 1— is a front view showing an eyeglass mounting with my improved attachment connected thereto and shown in section where connected to the nose bridge member.

Fig. 2— is a greatly enlarged section on line 2—2 of Fig. 1 showing the lens frame with my improved form of tubular member attached thereto.

Fig. 3— is an enlarged sectional end view showing the thick and thin walls of my improved form of tubular member.

Fig. 4— is a perspective view showing a portion of the tube from which my attachments are formed.

Referring to the drawings, 10 designates the lens frames in each of which a lens 11 is mounted. This frame may be made of any suitable material, but in my particular construction, I preferably form the frames of non-metallic material such as shell, celluloid and the like. The frame is preferably provided with a groove 12 on its inner circumference as best shown in Fig. 2. The frame is bent in the form to receive the desired shape of lens and its ends 13 are bound together by means of clamps 14, through the ears 15 of which is passed the binding screw 16.

The essential feature of my invention is the forming of a short section of tubing 17 which conforms essentially to the shape in cross section of the frame 10. This short length of tubing is passed over the end of the frame and slid around to a point opposite the joint, here it is secured to the frame preferably by indentations in its side walls, at the points 18 forming inwardly projecting pins or lugs which penetrate and permanently connect the tube to the frame.

It will be noted that the portion 21 of the tube which is on the outer diameter of the frame is formed much heavier or thicker than that portion 20 on the inner diameter of the frame and for several reasons. Among others being, first, that the nose-bridge member 19 must be soldered, riveted or otherwise securely connected to this tubular member, and therefore considerable stock must be provided with which to make a strong and serviceable connection thereto; second, the connection of the bridge member to these frames must be very rigid as they are required to withstand considerable strain in handling and also they must be strong enough to prevent breaking if dropped; and third, by forming the opposite wall of this tubular member extremely thin, it may be readily bent inward to conform perfectly with the concave curvature of the inner diameter of the frame and at the same time offer little or no interference with the periphery of the lens when snapped into position in the frame.

I do not wish to be restricted to forming the nose-bridge attaching members of tubing of my improved construction as the clamping members 14 may be formed of a tube having one portion thicker than another if desired.

I have described one illustrative embodiment of my invention but I do not wish to limit myself to the specific construction as various changes in shape and form of the tubing device may be necessary. I therefore desire it to be understood that I reserve the privilege of resorting to all the mechanical changes to which the invention is susceptible, the invention being defined by the appended claims.

I claim:

1. An attachment for eyeglass mountings comprising a pair of non-metallic lens frames connected by a nose-bridge member, a short section of metallic tubing embracing each frame, that portion of the tubing wall on the outer diameter of the frame being much thicker than that on its inner diameter.

2. An attachment for eyeglass mountings comprising a pair of non-metallic lens frames connected by a nose-bridge member, a short section of metallic tubing on each frame to which the ends of the nose-bridge are attached, the walls of said tubing being thicker on the side attached to the bridge than on its opposite side.

3. A connector for parts of eyeglass frames comprising a short section of tubing for securing and embracing the frame, the wall on one side of the tubing being thin and bendable to readily conform to the contour of the inner side of the lens frame, the opposite wall of said tubing being relatively thick to facilitate the connecting of parts thereto, and means for connecting said tubing to the frame.

In testimony whereof I affix my signature in presence of two witnesses.

JOSEPH ROSENBLATT.

Witnesses:
LEAH L. GOETHEEME,
KARL V. GODFRAY.

Copies of this patent may be obtained for five cents each, by addressing the "Commissioner of Patents, Washington, D. C."